US010010066B2

(12) United States Patent
Krondorfer

(10) Patent No.: US 10,010,066 B2
(45) Date of Patent: Jul. 3, 2018

(54) HYDRAULIC PRESS TOOL

(71) Applicant: Ridge Tool Company, Elyria, OH (US)

(72) Inventor: Harald Krondorfer, Aurora, OH (US)

(73) Assignee: RIDGE TOOL COMPANY, Elyria, OH (US)

( * ) Notice: Subject to any disclaimer, the term of this patent is extended or adjusted under 35 U.S.C. 154(b) by 379 days.

(21) Appl. No.: 14/690,522

(22) Filed: Apr. 20, 2015

(65) Prior Publication Data

US 2015/0308465 A1   Oct. 29, 2015

Related U.S. Application Data

(60) Provisional application No. 61/982,978, filed on Apr. 23, 2014.

(51) Int. Cl.
*A01M 1/02* (2006.01)
*A01M 1/04* (2006.01)
(Continued)

(52) U.S. Cl.
CPC .............. *A01M 1/103* (2013.01); *A01M 1/02* (2013.01); *A01M 1/04* (2013.01); *B25B 7/126* (2013.01);
(Continued)

(58) Field of Classification Search
CPC .......... A01M 1/02; A01M 1/04; A01M 1/103; A62B 3/005; B25B 7/126; B25F 5/005;
(Continued)

(56) References Cited

U.S. PATENT DOCUMENTS 3,254,522 A   6/1966 Elliott et al.
3,502,028 A   3/1970 Cooper
(Continued)

FOREIGN PATENT DOCUMENTS

CN   1915601   2/2007
CN   102259433   11/2011
(Continued)

OTHER PUBLICATIONS

International Search Report (ISR) and Written Opinion; PCT/US2015/26581; dated Aug. 31, 2015 (11 pages).
(Continued)

*Primary Examiner* — Logan Kraft
(74) *Attorney, Agent, or Firm* — Mark E. Bandy; Rankin, Hill & Clark LLP

(57) ABSTRACT

Hydraulic systems and tools having an actuator that actuates a pump and a control valve are described. The pump transports fluid into a chamber to advance a piston in the chamber. The control valve is biased open and regulates flow of hydraulic fluid from the chamber to a reservoir. The actuator is operable in a first state in which the control valve is open, allowing flow of fluid from the chamber to the reservoir, and the pump is not pumping. The actuator can be operated in a second state in which the control valve is closed, restricting flow of fluid from the chamber to the reservoir, and the pump is not pumping. The actuator can be operated in a third state in which the control valve is closed and the pump is pumping fluid from the reservoir into the chamber in order to advance the piston.

18 Claims, 8 Drawing Sheets

(51) Int. Cl.
    *A01M 1/10*      (2006.01)
    *B25B 7/12*      (2006.01)
    *B25F 5/00*      (2006.01)
    *H01R 43/042*    (2006.01)
    *F15B 15/08*     (2006.01)
    *F15B 15/18*     (2006.01)
    *F15B 15/20*     (2006.01)

(52) U.S. Cl.
    CPC ............... *B25F 5/005* (2013.01); *F15B 15/08* (2013.01); *F15B 15/18* (2013.01); *F15B 15/20* (2013.01); *F15B 15/202* (2013.01); *H01R 43/0427* (2013.01)

(58) Field of Classification Search
    CPC .......... F15B 11/08; F15B 11/15; F15B 15/08; F15B 15/18; F15B 15/1476; F15B 15/20; F15B 15/202; H01R 43/0427
    See application file for complete search history.

(56) References Cited

U.S. PATENT DOCUMENTS

| | | |
|---|---|---|
| 3,616,673 A | 11/1971 | Miklos |
| 4,007,911 A * | 2/1977 | Clarkson ............... F16K 3/0281 138/94.3 |
| 5,125,324 A | 6/1992 | Araki et al. |
| 5,195,354 A | 3/1993 | Yasui et al. |
| 5,375,638 A | 12/1994 | Green et al. |
| 5,473,805 A | 12/1995 | Wille |
| 5,553,478 A | 9/1996 | Di Troia |
| 5,682,659 A | 11/1997 | Chang |
| 5,687,567 A | 11/1997 | Hansson et al. |
| 5,706,541 A | 1/1998 | Gutelius et al. |
| 5,875,629 A | 3/1999 | Kimura |
| 5,924,828 A | 7/1999 | Lefavour et al. |
| 5,953,822 A | 9/1999 | Vogelsanger |
| 5,993,402 A | 11/1999 | Sauer et al. |
| 6,148,507 A | 11/2000 | Swanson et al. |
| 6,276,186 B1 | 8/2001 | Frenken |
| 6,301,948 B1 | 10/2001 | Weiland |
| 6,886,226 B1 | 5/2005 | Dear et al. |
| 7,464,578 B2 | 12/2008 | Ayer et al. |
| 7,841,223 B2 * | 11/2010 | Rollins ................ B25B 27/10 29/751 |
| 8,056,473 B2 | 11/2011 | Frenken et al. |
| 8,276,430 B2 * | 10/2012 | Barezzani ............ B25B 27/146 72/414 |
| 8,316,763 B2 | 11/2012 | Houser et al. |
| 2002/0170423 A1 | 11/2002 | Schultz |

FOREIGN PATENT DOCUMENTS

| | | |
|---|---|---|
| CN | 202985531 | 6/2013 |
| DE | 1531349 | 10/1969 |
| EP | 0687481 | 12/1995 |
| EP | 0936006 | 8/1999 |
| GB | 2301547 | 12/1996 |
| WO | 9965630 | 12/1999 |

OTHER PUBLICATIONS http://www.zuppertools.com/product_show.asp?id=359; fitting tool Item No. BZ-1550, 2 pages.
China—Application No. 201580004061.8; Search Report dated May 19, 2017; 4 pages.
China—Application No. 201580004061.8; Office Action dated May 19, 2017; 7 pages.
Europe—Application No. 15783935.8; Supplemental Search Report dated Nov. 17, 2017; 10 pages.

* cited by examiner

HYDRAULIC PRESS TOOL

CROSS REFERENCE TO RELATED APPLICATION

The present application claims priority upon U.S. provisional application Ser. No. 61/982,978 filed Apr. 23, 2014.

FIELD

The present subject matter relates to hydraulic systems, hydraulic tools, actuator assemblies used in such tools, and related methods.

BACKGROUND

Hydraulic power tools are employed in numerous applications to provide a user with a desired mechanical advantage in a wide range of applications for pressing, forming, crimping, cutting, or otherwise manipulating one or more workpieces. One example application is in crimping tools used for making electrical connections, such as crimping a terminal to an end of a wire. Another example application is in cutting tools where hydraulic pressure provides force for cutting the workpiece.

Conventional hydraulic tools generally comprise a tool body, a fluid reservoir, a hydraulic pump, a cylinder defining a chamber, and a piston (i.e. ram) capable of being moved through a pressing stroke (i.e. advancing stroke) inside the chamber from a starting position to an advanced position under the effect of an injection of pressurized fluid into the chamber. These tools may comprise a variety of different working heads that can be removably attached to the body and which are adapted to being operated by the piston for manipulating the workpiece as desired.

Conventional tools generally comprise a manually operated fluid return valve, also referred to herein as a "control valve", that when manually opened enables the pressure in the chamber to be reduced, whereby the fluid contained in the chamber is returned to the reservoir such that the piston is returned to a retracted position in the chamber with assistance from a spring or other biasing member. Typical fluid return valves are biased to be closed and are manually opened upon depressing a button or actuating lever for draining hydraulic fluid from the chamber. In certain tools, the button must be held in the depressed position to fully empty the chamber of hydraulic fluid and to fully retract the piston.

These tools also generally comprise an automatically operated pressure relief valve so that the pressure of the fluid injected into the chamber does not exceed a predetermined threshold. Pressure relief valves often comprise a movable needle closing a fluid escape opening and a spring holding the needle in the opening. The force exerted by the spring on the needle is calibrated so that the needle is automatically moved under the effect of the fluid pressure in the chamber only when the pressure reaches the predetermined threshold, referred to herein as the "set pressure" of the pressure relief valve, and closes when the pressure is below a predetermined threshold, referred to herein as the "reseating pressure" of the pressure relief valve.

Conventional electrically powered tools also typically comprise a switch for operating a motor, which drives the pump for pumping hydraulic fluid from the reservoir to the cylinder. The switch for the motor is turned on and off by use of a trigger or similar control means on most tools. The trigger for the motor is separate and distinct from the button for opening the return valve. This configuration thus requires separate manipulation of the trigger and the control valve button, wherein an operator has to depress the trigger to close the motor switch to operate the motor and separately depress the control valve button to drain hydraulic fluid from the cylinder.

Although satisfactory in many regards, known hydraulic power tools suffer from a variety of issues. Accordingly, a need remains for new hydraulic systems and tools using such systems.

SUMMARY

The difficulties and drawbacks associated with previously known hydraulic systems, tools and methods are addressed in the present hydraulic system and tools and related combinations and methods.

In one aspect, the present subject matter provides a multi-position actuator assembly for use in a hydraulic system. The actuator assembly comprises a trigger positionable to at least three states. The actuator assembly also comprises a switch in operable engagement with a pump in the hydraulic system. And, the actuator assembly additionally comprises a hydraulic valve in flow communication between a hydraulic cylinder and piston and a hydraulic reservoir tank in the hydraulic system. The trigger is positionable to (i) a neutral state at which the valve is closed and the switch is open, (ii) a forward state at which the valve is closed and the switch is closed, and (iii) a reverse state at which the valve is open and the switch is open.

In another aspect, the present subject matter provides a hydraulic tool comprising a tool body and a hydraulic cylinder at least partially enclosed and supported within the tool body. The cylinder defines a chamber. The hydraulic tool also comprises a fluid reservoir in flow communication with the cylinder. The hydraulic tool additionally comprises a fluid inlet line providing flow communication between the fluid reservoir and the chamber of the hydraulic cylinder. The hydraulic tool also comprises a valve governing fluid flow between the cylinder and the reservoir. The tool also comprises a fluid pump in flow communication with the reservoir and the cylinder via the inlet line. The pump is selectively operable by a switch to displace fluid from the reservoir into the chamber. The hydraulic tool also comprises a spring biased piston movably disposed in the chamber of the hydraulic cylinder. The hydraulic tool additionally comprises a multi-position actuator including a trigger positionable to at least three states, in which the trigger is positionable to (i) a neutral state at which the valve is closed and the switch is open, (ii) a forward state at which the valve is closed and the switch is closed, and (iii) a reverse state at which the valve is open and the switch is open.

In another aspect, the present subject matter provides a hydraulic tool comprising a tool body, a hydraulic cylinder, a fluid reservoir, a fluid inlet line, a fluid pump, a biased piston, a pressure relief valve, a fluid return line, and a multi-position return valve. The hydraulic cylinder is at least partially enclosed and supported within the tool body and defines a chamber. The fluid reservoir is in flow communication with the cylinder. The fluid inlet line provides flow communication between the fluid reservoir and the chamber of the hydraulic cylinder. The fluid pump is in flow communication with the reservoir and the cylinder via the inlet line. The pump is selectively operable to displace fluid from the reservoir into the chamber. The biased piston is movably disposed in the chamber of the hydraulic cylinder, wherein upon displacement of fluid into the chamber from the pump, the piston is moved away from a biased position. The pressure relief valve is in flow communication with the chamber of the hydraulic cylinder and the reservoir. The fluid return line provides flow communication between the chamber of the hydraulic cylinder and the reservoir. The multi-position return valve is in flow communication with the chamber of the cylinder and the reservoir via the return line. The return valve has a plurality of valve positions, including a biased open position and closed position. The return valve is biased to the normally open position, thereby allowing fluid flow between the chamber of the hydraulic cylinder and the reservoir. Upon positioning the return valve in the closed position, the return valve thereby prevents fluid flow via the fluid return line between the chamber of the hydraulic cylinder and the reservoir. The return valve comprises a fluid control member such that upon positioning the return valve between the open position and the closed position, the fluid control member is moved across a direction of fluid flow in the fluid return line at the return valve.

In another aspect, the present subject matter provides a hydraulic tool comprising a chamber and a piston movably mounted relative to the chamber. The tool includes a reservoir in fluid communication with the chamber. The tool includes a supply line for transporting hydraulic fluid from the reservoir to the chamber. The tool includes a pump configured to pump hydraulic fluid through the supply line to the chamber for moving the piston relative to the chamber. The tool includes a first return line and a second return line for transporting hydraulic fluid from the chamber to the reservoir. The tool includes a control valve configured to regulate flow of hydraulic fluid in the first return line, in which fluid flow in the first return line between the chamber and the reservoir is not restricted by the control valve when the control valve is open, and fluid flow in the first return line between the chamber and the reservoir is restricted when the control valve is closed. The tool includes a pressure relief valve configured to regulate flow of hydraulic fluid in the second return line, in which the control valve and the pressure relief valve are in parallel communication between the chamber and the reservoir. The tool includes an actuator for actuating the pump and the control valve. The actuator is configured to be operable in a first state in which the control valve is open and the pump is not pumping, a second state in which the control valve is closed and the pump is not pumping, and a third state in which the control valve is closed and the pump is pumping. The control valve cannot open when the actuator is in the second and third states.

In still another embodiment, the present subject matter provides a method of operating a hydraulic tool that includes a multi-position actuator assembly having a trigger positionable to at least three states, a switch in operable engagement with a pump in the hydraulic tool, a hydraulic valve in flow communication between a hydraulic cylinder and piston and a hydraulic reservoir tank in the hydraulic system, wherein the trigger is positionable to (i) a neutral state at which the valve is closed and the switch is open, (ii) a forward state at which the valve is closed and the switch is closed, and (iii) a reverse state at which the valve is open and the switch is open. The method comprises positioning the trigger to the forward state to thereby cause operation of the pump and dispense hydraulic fluid into the cylinder, whereby the piston is extended.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
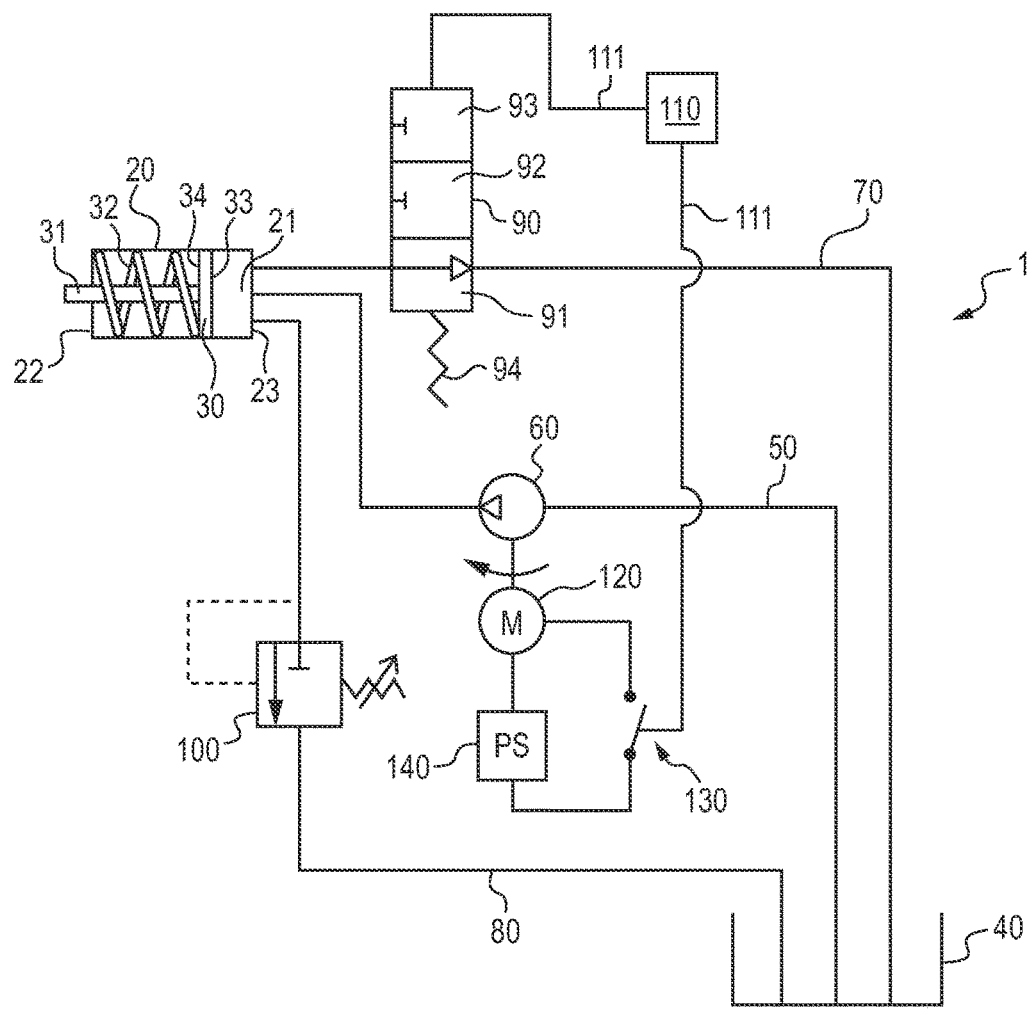
FIG. 1 is a schematic diagram of a hydraulic system in accordance with the present subject matter.

The subject matter described herein provides hydraulic systems, tools, actuator assemblies, and methods of operating the hydraulic systems and tools. The various hydraulic systems, tools, actuators, and methods can be used for performing work on a workpiece through the pressing stroke of a piston. The hydraulic systems of the present subject matter and tools incorporating the hydraulic systems share many common features, which are depicted in the figures with like reference numbers. It will be understood that descriptions of features for the hydraulic systems of the present subject matter, also describe the similar features for the hydraulic tools.

In certain embodiments, the present subject matter relates to hydraulic systems and tools having a single multi-position actuator (also referred to herein as a "trigger") for operating both a switch and a control valve. The actuator integrally operates both the pump and the control valve, wherein an operator does not have to operate the control valve separate from operating the motor switch. More specifically, the control valve can be actuated by operating the actuator, rather than by operating a button that is separate and distinct from the actuator for the motor switch.

The present subject matter also relates in certain embodiments, to hydraulic systems and tools having a control valve that is biased to a normally open position, thereby allowing fluid to freely flow from a chamber to a reservoir through a fluid return line. When actuated by the actuator, the control valve is moved from the normally open position, to a closed position, thereby restricting fluid flow through a fluid return line.

Such configuration provides hydraulic systems and tools that are conveniently operated with the use of a single actuator for both the control valve and the motor switch, rather than having separate actuators for the control valve and the motor switch as in conventional tools. Further, the present subject matter provides systems and tools comprising an actuator, that when released, moves the control valve to a normally open position.

In particular embodiments, the present subject matter provides hydraulic systems and tools, wherein the pressure in the chamber can be released through the first return line simply by releasing the actuator. Upon release of the actuator, the actuator returns to its normally biased, fully extended position, such that the control valve is opened and the pump does not pump. Opening of the control valve allows hydraulic fluid to flow out of the chamber and to the reservoir; resulting in retraction of the piston. Separately pressing a control valve button, as in conventional tools, is not required by the instant subject matter in order to drain the chamber of fluid and retract the piston. Manual operation of a control valve button in conventional tools can be considered tedious, particularly when the operator has to perform a large number of operations in succession. Further, the automatic retraction of the piston upon release of the actuator provides a simple safety feature that is intuitive and can be initiated quickly and easily.

The hydraulic systems and tools of the present subject matter generally comprise a cylinder defining a chamber; a biased piston moveably disposed within the chamber; a fluid reservoir for hydraulic fluid in flow communication with the cylinder; a supply line (i.e. a fluid inlet line) for delivering hydraulic fluid from the reservoir, to the chamber, and against a rear surface of the piston for advancing the piston relative to the chamber; a fluid pump configured to pump hydraulic fluid through the supply line; a first fluid return line and a second fluid return line for transporting hydraulic fluid from the chamber to the reservoir; a multi-position control valve (i.e. "return valve") in the first return line configured to regulate flow of hydraulic fluid in the first return line; a pressure relief valve configured to regulate flow of hydraulic fluid in the second return line; and an actuator for actuating the pump and the control valve. The actuator is as referred to herein as an "actuator assembly" or "control provisions." The control valve and the pressure relief valve are in parallel communication with each other. The tools of the present subject matter further comprise a tool body to which the features of the hydraulic system are incorporated.

The multi-position control valve of the present subject matter can be operated in a plurality of positions. In one embodiment, the control valve is biased to a normally open position, allowing fluid flow in the first return line. In one embodiment, the pressure relief valve and the control valve are in parallel communication with the chamber and the reservoir. In one embodiment, the actuator of the hydraulic systems and tools is operable in as least three states. In accordance with the present subject matter, the actuator is biased in a first state, wherein the control valve is open and the pump is not pumping. The actuator can be operated in a second state, wherein the control valve is closed for restricting flow of hydraulic fluid from the chamber to the reservoir, and the pump is not pumping. The actuator can be operated in a third state, wherein the control valve is closed and the pump is pumping hydraulic fluid to the chamber. The hydraulic systems and tools incorporating the hydraulic systems of the present subject matter will be described in more detail in reference to the figures.

In one embodiment as depicted in FIG. 1, a hydraulic system 1 in accordance with the present subject matter includes a cylinder 20 defining a chamber 21. A piston 30, including a ram 31, is moveably disposed at least partially within the chamber 21. The piston has a rear surface 33 and a front surface 34, and is configured to perform work on a workpiece.

The cylinder and piston configuration is not particularly limited by the present subject matter and can include single-acting and/or potentially double-acting systems. As depicted in FIG. 1 and in accordance with one embodiment, the cylinder and piston comprise a single-acting hydraulic system, wherein the piston 30 is urged to a biased position toward the rear end 23 of the cylinder by a piston return spring 32. The rear end of the cylinder is also referred to herein as the cylinder base. The cylinder base 23 is connected to a supply line 50, a first return line 70, and a second return line 80. The supply line and the first and second return lines provide fluid communication between a reservoir 40 and the chamber 21.

Figure 3:
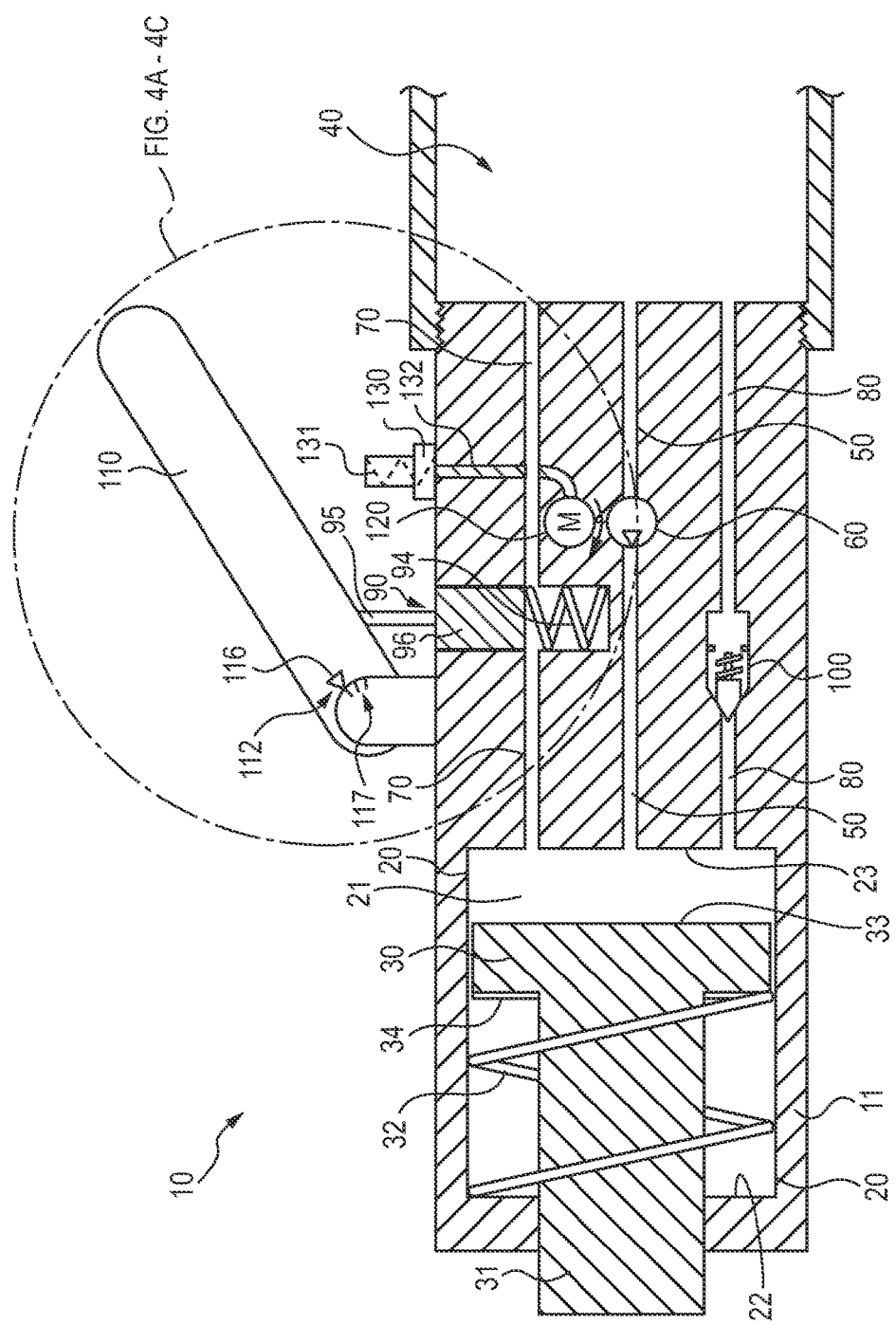
FIG. 3 is a schematic cross-sectional view of a hydraulic tool in accordance with the present subject matter.

In accordance with the present subject matter, the supply line 50 is configured to provide fluid communication between the reservoir 40 and the chamber. As shown in FIGS. 1 and 3, the systems and tools include a pump 60 for pumping hydraulic fluid through the supply line, into the chamber, and against the rear surface 33 of the piston in order to advance the piston 30 relative to the chamber. In one embodiment as shown in FIG. 1, the hydraulic system is an electrohydraulic system, wherein the pump 60 is connected to an electric motor 120, or other type of motor, which is connected to a power source 140. When the motor switch 130 is closed, the motor 120 derives power from the power source 140 to drive the pump 60 and to thereby urge hydraulic fluid from the reservoir 40, through the supply line 50, to the chamber 21, and against the rear surface 33 of the piston 30. The switch 130 for activating the motor is controlled by an actuator 110 or other control provisions through actuator communication channel 111 as depicted. In certain embodiments, the communication channel can be a mechanical connection. In accordance with the present subject matter, it will be understood that the pump can also be manually operated, rather than being powered by a motor and thus not utilize the switch 130.

When hydraulic fluid is pumped into the chamber 21 through the supply line and against the rear surface 33 of the piston, hydraulic pressure increases within the chamber and against the rear surface of the piston, urging the piston to move relative to the chamber and the cylinder toward a front end 22 of the cylinder. This movement of the piston is referred to herein as "advancing", "advancement", a "pressing stroke", or an "advancing stroke" of the piston. The front end of the cylinder is also referred to herein as the cylinder head.

During an advancing stroke, the piston return spring 32 is compressed between the front surface 34 of the piston and the cylinder head 22. When pressure is released from the chamber, the piston return spring moves the piston 30 towards the rear end 23 of the cylinder. This movement towards the rear end of the cylinder is referred to herein as "retract", "retracted", "retracting", "retraction", "return stroke", or a "retracting stroke" of the piston.

In accordance with the present subject matter, the first return line 70 provides flow communication between the chamber 21 and the reservoir 40 and is configured to transport hydraulic fluid from the chamber 21 to the reservoir 40. The hydraulic systems and tools include a control valve 90 for regulating the flow of hydraulic fluid in the first return line. The construction of the control valve 90 is not particularly limited by the present subject matter and can comprise one or more spool valves, gate valves, ball valves, or the like that comprise a fluid control member 96 (see FIG.

3) for restricting fluid flow in the first return line between the chamber 21 and the reservoir 40. As used herein, "fluid control member" is that portion of the control valve that is inserted into the fluid flow. As shown in FIGS. 3 and 4A-4C, the control valve 90 can be in the form of a spool valve, wherein the fluid control member 96 is a spool that is inserted into the fluid flow of the first return line 70. The fluid control member can take other forms in accordance with the present subject matter, such as forms that are associated with other types of valves. For example, the fluid control member can be a gate in a gate valve, a ball in a ball valve, a disk in a butterfly or tilting disk valve, a plug in a globe or rotary valve, a diaphragm in a diaphragm valve, or the like.

Figure 4A:
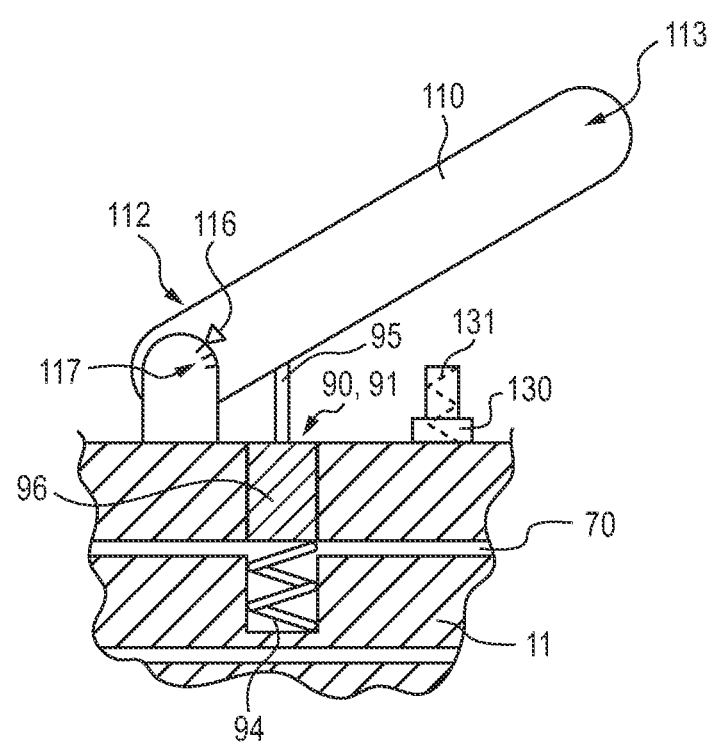
FIGS. 4A-4C are detailed schematic cross-sectional views of the area within the circle of FIG. 3 showing the actuator operated in various states in accordance with the present subject matter.

In one embodiment and as depicted in FIGS. 1, 3, and 4A-4C, the control valve 90 is biased to an open position such that hydraulic fluid is able to freely flow through the first return line, from the chamber 21 to the reservoir 40. This biased open position of the control valve, is associated with the fluid control member 96 not being inserted into the fluid flow of the first return line 70 and is referred to herein as the first position 91 of the control valve and is depicted in FIG. 4A. The control valve 90 can also be operated in either a closed second intermediate position 92 (shown in FIG. 4B), or a closed third position 93 (shown in FIG. 4C), which are associated with the fluid control member 96 being inserted into the fluid flow of the first return line 70 such that hydraulic fluid is restricted from flowing from the chamber 21 to the reservoir 40 through the first return line 70. In one embodiment, the control valve is only operable in a first open setting and a second closed setting, which will be described in greater detail below.

As shown in FIG. 1, the actuator 110 is configured to operate the control valve through the various positions by means of the actuator communication channel 111. In one embodiment, the actuator communication channel 111 comprises a control valve actuator 95 connected to the fluid control member 96 as depicted in FIGS. 3 and 4A-4C. The actuator communication channel 111 can comprise other communication means. The actuator is used to move the valve. The actuator can operate the control valve from the biased open first position 91, to the closed second 92 and third 93 positions in order to insert the fluid control member into the fluid flow of the first return line so as to restrict the flow of hydraulic fluid in the first return line 70.

Figure 4B:
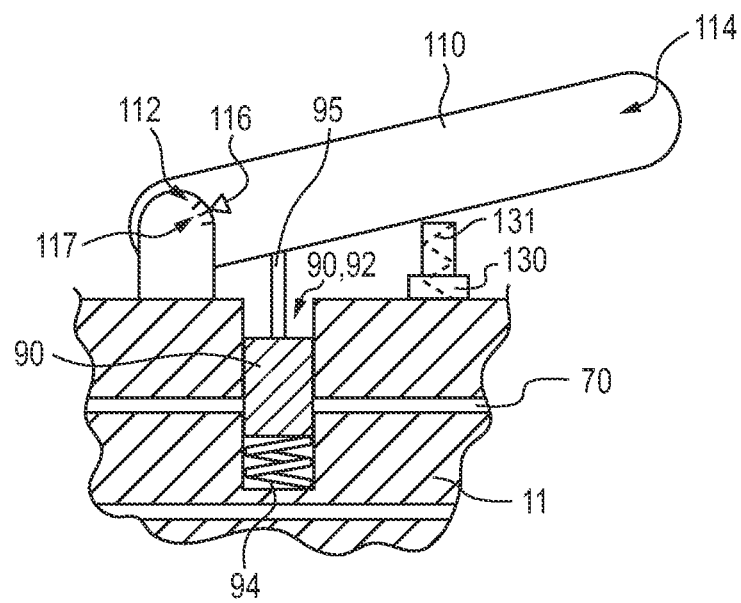
Figure 4C:
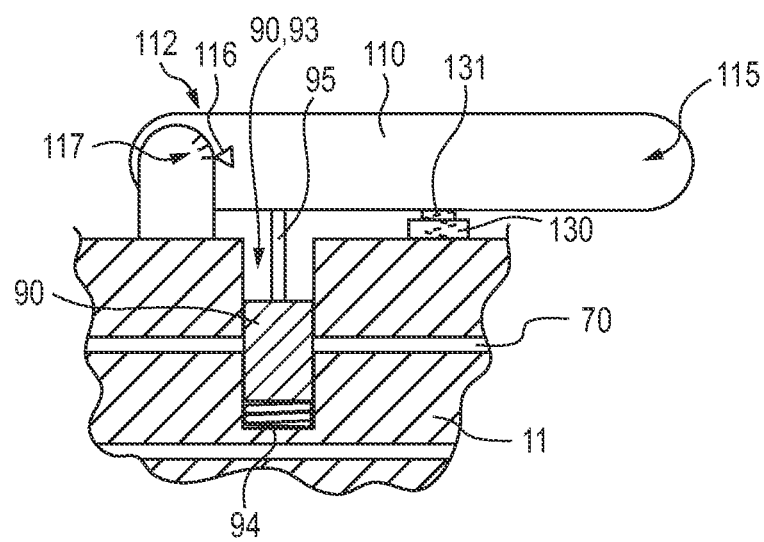

In one aspect (FIGS. 1, 3, and 4A-4C), the control valve 90 is biased by a spring 94 to the open first position 91. Operation of the control valve to the closed second 92 or third 93 positions thereby compresses the control valve spring 94 as depicted in FIGS. 4B-4C. In accordance with the present subject matter, the control valve 90 can be biased or unbiased, and can further be biased to the first position 91 by other means, including for example, wherein a biased actuator 110 urges the control valve to the open first position. In one aspect, the control valve itself does not include a biasing member such as a spring (i.e. is unbiased), but is urged to the first position only by a biased actuator. When the actuator is no longer operating the control valve in the second 92 or third 93 closed positions, the control valve will return to the biased first open position 91, thereby allowing hydraulic fluid to flow from the chamber to the reservoir. In accordance with the present subject matter, at least one of the control valve and the actuator are biased such that the control valve is normally open in the first position 91.

In one embodiment in accordance with the present subject matter, as the control valve is moved between the first, second, and third positions, the fluid control member is displaced in a non-parallel direction with a direction of fluid flow in the fluid return line at the return valve. It will be understood that when referring to the direction of fluid flow "at the control valve", it is meant a direction of fluid flow in the first return line, at a location that is directly adjacent to the control valve and on the side of the control valve that is in flow communication with the portion of the first return line leading to the chamber.

For example, as depicted between FIGS. 4A-4C, the fluid flow in the first return line 70 at the control valve 90 (and for that matter fluid flow in the entirety of the first return line) is from left to right in the figures. The fluid control member 96, being a spool in a spool valve, is displaced or moved in an up and down direction in the figures as the control valve is moved between the first, second and third positions. That is, the direction of displacement or movement of the fluid control member 96 is up and down, which is across and/or non-parallel to the direction of fluid flow from left to right in the first return line 70 at the control valve. More specifically, the direction of displacement or movement of the fluid control member 96 is transverse to the direction of fluid flow in the first return line 70.

While the direction of displacement or movement of the fluid control member 96 is depicted between FIGS. 4A-4C as being transverse to the direction of fluid flow in the first return line at the control valve, it will be understood that the present subject matter is not limited to this particular transverse relationship, but can include a fluid control member that is displaced or moved in other directions in relation to the direction of fluid flow in the first return line at the control valve.

For example, the control valve 90 can comprise a ball valve, such that the ball (i.e. the fluid control member) is moved in a rotational direction in order to restrict the flow of fluid in the first return line. In this example, it will be understood that the direction of rotational displacement or movement of the ball is non-parallel to the direction of fluid flow from left to right in the first return line at the control valve.

Further, while the entirety of the first return line 70 is depicted as extending straight between the chamber and the reservoir, and thus the direction of fluid flow therein at the control valve is from left to right, it will be understood that the first return line may include portions that are not necessarily straight from left to right, e.g. portions that curve, bend, or turn. In this respect, it will be understood that the direction of fluid flow at the control valve can be other than from left to right in the figures and can include a direction such as from down to up in the figures, for example. In this way, displacement or movement of the fluid control member will be in a direction that is non-parallel with the direction from down to up, e.g. right to left.

In one embodiment, pressure exerted from hydraulic fluid pumped to the chamber, will not push against the fluid control member in a direction that urges the fluid control member out of the fluid flow in the first return line. In other words, upon closing the control valve and pumping hydraulic fluid to the chamber, pressure will build in the chamber in order to advance the piston. Concurrently, pressure will also build in the first return line 70 between the chamber and the control valve 90, and in the second return line 80 between the chamber and the pressure relief valve 100. In this embodiment, the control valve 90 is configured such that hydraulic fluid pumped to the chamber exerts pressure on the control valve in a direction other than in a direction that may open the control valve. The control valve 90 is configured, such that hydraulic fluid pumped to the chamber does not exert pressure on the fluid control member in a direction of opening. In other words, the fluid pressure does not push against the return between FIGS. 4A-4C, wherein the control valve 90 is depicted as a spool valve that opens and closes with up and down movement of the fluid control member 96. Hydraulic fluid pumped to the chamber 21 exerts pressure against the left side of the fluid control member 96, thereby urging the fluid control member towards the right in the figures. It will be appreciated however, that in order for the control valve 90 to open, the fluid control member 96 must be moved up and out of the path of the first return line 70. Due to the configuration of the control valve 90, movement of the fluid control member to the right is not possible, and therefore pressure exerted from the high pressure fluid in chamber 21 is incapable of moving the fluid control member 96 up and out of the fluid flow in the first return line, and is thereby incapable of opening the control valve 90.

In contrast, if a pressure relief valve was used as the control valve for example such that a direction of displacement of the cone was parallel with the direction of fluid flow in the first return line at the control valve, then the cone of the pressure relief valve would be urged to an open position by pressure from hydraulic fluid in the chamber. This specific configuration and operation is present and desirable in the operation of the pressure relief valve 100 in the second return line 80. However, such configuration and operation is not incorporated into the control valve. Accordingly, in this embodiment, the control valve does not comprise a pressure relief valve wherein a direction of displacement or movement of the cone was parallel with the direction of fluid flow in the first return line at the control valve.

As depicted in FIGS. 1, and 4B-4C, the second position 92 and the third position 93 of the control valve are closed, thereby restricting flow of hydraulic fluid between the chamber 21 and the reservoir 40 through the first return line 70. It will be understood that the present subject matter is not limited to a control valve that completely closes when operated in the second and third positions, but rather also includes a control valve that partially restricts the flow of hydraulic fluid in the first return line when in the second and third positions, so long as the pump is still able to advance the piston through an advancing stroke when the control valve is in the second and third positions.

Figure 5:
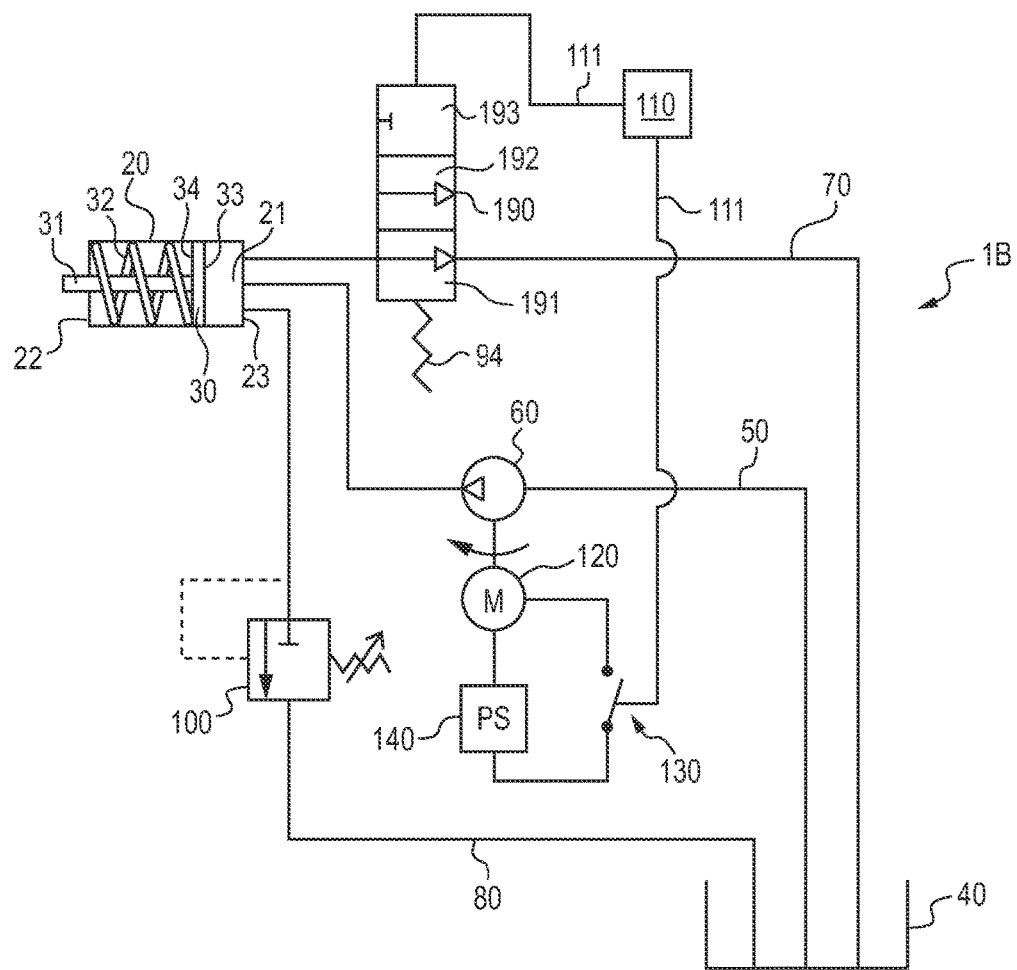
FIG. 5 is a schematic diagram of another variant hydraulic system in accordance with the present subject matter.

Another embodiment hydraulic system is depicted in FIG. 5. The variant hydraulic system 1B depicted in FIG. 5 is similar to the system 1 shown in FIG. 1, except for the configuration and operation of the control valve. Features in FIGS. 1 and 5 having the same reference numerals can have the same or similar functions. Therefore their respective descriptions are omitted in regard to FIG. 5. However, the system 1B of FIG. 5 has a control valve 190 having an open first position 191, an open intermediate second position 192, and a closed third position 193. In this embodiment, the actuator 110 can operate the control valve 190 from the biased open first position 191, to the open second position 192, and to the closed third position 193 in order to restrict the flow of hydraulic fluid in the first return line 70.

The control valve can be operated by the actuator via mechanical means, electronic means, or by a combination thereof. In one embodiment, the control valve is mechanically connected with the actuator such that moving the actuator through the various states, thereby physically moves the control valve between the first, second, and third positions. This embodiment is depicted for example, in FIGS. 3 and 4A-4C, wherein the actuator 110 is physically connected to the control valve through a control valve actuator 95, also referred to herein as a "return valve actuation member." In this way, the control valve cannot open when the actuator is in the second and third states. In one embodiment, the control valve can open only when the actuator is operated in the first state. In another embodiment, the actuator is in electronic communication with the control valve through actuator communication channels 111.

In accordance with the present subject matter, the second return line 80 provides flow communication between the chamber 21 and the reservoir 40 and is configured to transport hydraulic fluid from the chamber 21 to the reservoir 40. In one embodiment, the second return line 80 is connected to the cylinder base 23 and fluidly connects the chamber 21 and the reservoir 40.

The hydraulic systems and tools include a pressure relief valve 100 for regulating the flow of hydraulic fluid in the second return line. In one embodiment, the pressure relief valve is an automatic pressure relief valve as known in the art. The pressure relief valve can also include a manual lever to open the pressure relief valve in an emergency or other situation.

In one embodiment in accordance with the present subject matter and as shown in FIGS. 1, 3, and 5, the pressure relief valve 100 is normally in a biased closed position. In operation, when the pressure in the chamber 21 exceeds the set pressure of the pressure relief valve, the pressure relief valve opens, thereby allowing hydraulic fluid to flow out of the chamber, through the second return line 80, and into the reservoir 40. When the pressure in the chamber falls below the reseating pressure, the pressure relief valve will again return to the biased closed position and restrict fluid flow through the second return line 80. This process of opening and closing of the pressure relief valve in response to pressure levels in the chamber is referred to herein as a "cycle" or "cycling" of the pressure relief valve.

In one embodiment, the pressure relief valve 100 is separate and independent from the control valve 90 and the two valves are not combined into a single valve, thus the two separate valves offer a more robust and durable configuration over a combined control valve and pressure relief valve, which can be delicate and expensive to implement. In this embodiment, the return line for the pressure relief valve can be of smaller diameter than the return line for the separate control valve, which is desirably relatively large for quicker draining of fluid from the chamber and quicker retraction of the piston.

Pressure relief valves are typically constructed with smaller orifices than other hydraulic valves, so that smaller pintles and springs can be used to hold the valve closed against high pressure. The larger the orifices in a pressure relief valve, the larger the cone, pintle and spring have to be to resist the large amount of pressure in the chamber. Having a smaller return line or smaller orifices for the pressure relief valve compared to other types of hydraulic valves, allows for the pressure relief valve to include a smaller cone, pintle, and spring, thereby saving on weight and cost of producing the valve.

In one aspect, the smallest orifice in the return valve is larger than the smallest orifice in the pressure relief valve. In this regard, the control valve—which is configured to handle a majority of the fluid flow from the chamber to the reservoir—can have larger orifices to provide quicker retraction of the piston. The larger orifices allow potentially contaminated fluid to pass therethrough more easily in comparison to smaller orifices that are present in pressure relief valve. In contrast, if for example, a pressure relief valve was used as the control valve to retract the piston, retraction speeds could be limited by the smaller orifices in the pressure relief valve and contamination in the fluid could potentially negatively impact functioning of the pressure relief valve.

A further benefit of having separate control and pressure relief valves is that any adjustment made to the pressure relief valve in order to vary the set pressure or the reseating pressure, will not affect the operation of the separate control valve in any way.

Figure 2:
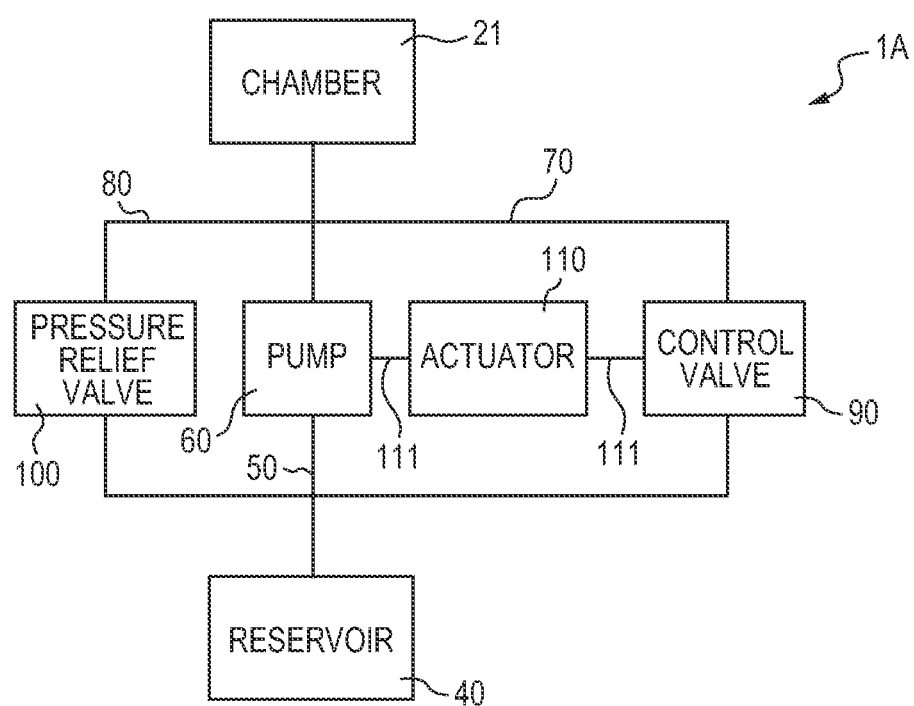
FIG. 2 is a schematic diagram of a variant hydraulic system in accordance with the present subject matter.

In one embodiment, the pressure relief valve 100 and the control valve 90 are in parallel communication between the chamber and the reservoir. That is, the pressure relief valve and the control valve operate independently from each other and are not in series communication, i.e. one after the other. In other words, hydraulic fluid can flow from the chamber to the reservoir through one of the pressure relief valves and the control valve without necessarily passing through the other valve. This embodiment is depicted in FIGS. 1-3 and 5, wherein the pressure relief valve and the control valve are in parallel communication between the chamber and the reservoir. FIG. 2 illustrates a variant system 1A of the system 1 shown in FIG. 1. In FIGS. 1 and 3, the valves 90, 100 are in parallel communication, and the return lines 70, 80 are in parallel communication. In FIG. 2, the valves 90, 100 are connected in parallel while the return lines 70, 80 join together before their communication with the chamber and the reservoir. In FIG. 5, the valves 190, 100 are in parallel communication, and the return lines 70, 80 are in parallel communication.

In one aspect, the first return line 70 is in parallel communication with the second return line 80, between the chamber and the reservoir. That is, the first and second return lines operate independently from each other and are not in series, i.e. one after the other. More specifically, hydraulic fluid can flow from the chamber to the reservoir through one of the first and second return lines without necessarily passing through the other return line.

In another aspect, the first return line and the second return line each comprise a continuous fluid line between the chamber and the reservoir. This aspect is depicted in FIGS. 1 and 3, wherein the first 70 and second 80 return lines are completely separate and distinct from each other, and wherein valves 90, 100 are in parallel with each other.

With particular reference to FIG. 2, it is shown that the variant system 1A includes the previously described chamber 21, the pressure relief valve 100, the pump 60, the actuator 110, the control valve 90, and the reservoir 40. In this embodiment, it can be seen that the pressure relief valve 100 and the control valve 90 are separate and independent from one another and in parallel. However, it can also be seen that the supply line 50, the first return line 70, and the second return line 80, all join together in a unitary line before connecting to the chamber. Likewise, these three lines 50, 70, 80 are also joined together in another unitary line before communication with the reservoir 40. Although FIG. 2 depicts the first return line 70 and the second return line 80 joining before they are in communication with the cylinder chamber 21 or the reservoir 40, it will be understood that valves 90, 100 are nevertheless in parallel. This is in contrast to being in series, wherein hydraulic fluid flowing from the reservoir 40 to the cylinder chamber 21 or vice versa, would first flow through one of the pressure relief valve 100 and the control valve 90, and then the other.

This is in contrast to FIGS. 1 and 3, wherein the supply line 50, the first return line 70 and the second return line 80, are all independent lines running continuously from the chamber 21 to the reservoir 40 without joining any other lines.

In accordance with the present subject matter, the hydraulic systems and tools of the present subject matter include an actuator 110, also referred to herein as a trigger. The actuator is configured to operate the pump 60 by closing the switch 130, as well as being configured to operate the control valve 90. The actuator 110 is in communication with the control valve 90 through an actuator communication channel 111 as shown in FIG. 1, or is mechanically connected to the control valve as shown in FIGS. 3 and 4A-4C. The actuator 110 is able to operate the control valve 90 between the biased open first position 91, and the closed second position 92 and third position 93.

The actuator 110 is also configured to operate the pump 60 by closing the switch 60 through communication channel 111 such as by actuating a mechanical linkage, as shown in FIGS. 1-2 and 5 or by depressing the switch 130 as shown in FIG. 4C. In one embodiment, the switch 130 is biased to an open position as depicted in FIGS. 1, 3, 4A-4B, and 5. When operated by the actuator 110, the switch can be moved to a closed position (FIG. 4C), thereby connecting the power source 140 to the motor 120 for powering the motor and driving the pump 60.

In accordance with one embodiment of the present subject matter, and as shown in FIGS. 4A-4C, the actuator 110 can be operated in at least three states. In one embodiment, the actuator 110 is biased to a first state 113, wherein the control valve 90 is open in the first position 91 and the switch 130 is open. When operated in a second state 114, the control valve 90 is closed in the second position 92 and the switch 130 is still open. When operated in a third state 115, the control valve 90 is still closed in the third position 93 and the switch 130 is closed, thereby actuating the motor 120 to drive the pump 60, which urges hydraulic fluid to the chamber 21.

In another embodiment, the actuator is configured to be operable in only two arrangements, wherein a first arrangement includes the functions of the previously described first and second states, and wherein a second arrangement includes the functions of the previously described third state. In this embodiment, the actuator can be paired in a system including the control valve having only a first open setting and a second closed setting.

In this embodiment, when the actuator is operated in the first arrangement, the control valve is in the first open setting and the pump is not pumping. When the actuator is operated in the second arrangement, the control valve is in the second closed setting and the pump is pumping. In this embodiment, the piston advances when the actuator is operated in the second arrangement because the pump is pumping hydraulic fluid to the chamber and the control valve is closed. The piston does not advance when the actuator is operated in the first arrangement because the pump is not pumping. Further, if the piston has been previously advanced, the piston will retract when the actuator is operated in the first arrangement because the control valve is open.

In still another embodiment shown in FIG. 5, the actuator 110 can be operated in at least three states. In this embodiment, when the actuator 110 is operated in a first state, the control valve 190 is open in the first position 191 and the switch 130 is open. When the actuator is operated in a second state, the control valve 190 is open in the second position 192 and the switch 130 is closed, thereby actuating the motor 120 to drive the pump 60, which urges hydraulic fluid to the chamber 21. However, since the control valve 190 is open in the second position 192, the piston 30 does not advance and hydraulic fluid drains from the chamber 21 to the reservoir 40 through the first return line 70. This may be useful to pump fluid through the fluid lines to flush any deposits or contaminations back to reservoir 40. When the actuator 110 is operated in a third state, the control valve 190 is closed in the third position 193 and the switch 130 is closed, thereby actuating the motor 120 to drive the pump 60. Hydraulic fluid urged to the chamber 21 thereby advances the piston 30 due to the control valve 190 being closed. In practice, the second state of the actuator 110 may be an overlap between the functional ranges of states 1 and 3 to account for manufacturing tolerances of a hydraulic tool.

The operation of the actuator is not particularly limited and can include depressing, sliding, turning, or otherwise moving the actuator; electronically operating the actuator; and combinations thereof. In one embodiment, operating the actuator comprises depressing the actuator (FIGS. 4B-4C). In this embodiment, the actuator is biased to a fully extended position when in the first state 113 (FIG. 4A). When operated in the second state 114, the actuator is moved to an intermediate, partially depressed position (FIG. 4B). When operated in the third state 115, the actuator is moved to a fully depressed position (FIG. 4C).

It will be understood that the configuration of the actuator is also not particularly limited by the present subject matter and can comprise any configuration that accomplishes the described operation of the control valve and pump. As such, the actuator can comprise one or more electronic actuators, pistol-type triggers, lever-type actuators, or any other configuration or combinations thereof that can perform the functions described herein. In one embodiment, the actuator is a lever-type trigger as depicted in FIGS. 3 and 4A-4C.

In accordance with the present subject matter, the hydraulic systems 1, 1A, and 1B of the present subject matter can be incorporated into numerous different hydraulic tools, optionally including various working heads, and is not limited to one particular type of hydraulic tool.

One embodiment tool is depicted in FIG. 3, portions of which are shown in detail in FIGS. 4A-4C. FIG. 3 shows a hydraulic tool 10 in accordance with the present subject matter, and comprising a tool body 11, which at least partially defines the cylinder 20. In one aspect, the cylinder is at least partially enclosed and supported within the tool body. The cylinder defines a chamber 21 in which the piston 30 (including the ram 31) is moveably disposed. The piston 30 is biased with a piston return spring 32 in a retracted position towards the rear end 23 of the cylinder. The piston return spring is disposed between a front surface 34 of the piston 30 and a front end 22 of the cylinder 20. The piston 30 can be advanced towards the front end of the cylinder through application of hydraulic pressure in the chamber 21 against the rear surface 33 of the piston.

Like the hydraulic system 1 as described herein, the hydraulic tool 10 includes a supply line 50, a first return line 70, and a second return line 80, that provide fluid communication between the chamber 21 and the reservoir 40. As shown in FIG. 3, the tool includes a motor 120 for driving the pump 60 that urges hydraulic fluid from the reservoir to the chamber and against the rear surface of the piston. The motor is connected via a communication channel 132 which can for example be in the form of an electrical connector, to the switch 130 located on the tool body 11.

In one embodiment, and as depicted in FIGS. 3 and 4A-4C, the switch is shown to include a switch spring 131 that biases the switch in an open position. The switch is operable by depressing the actuator 110 to a fully depressed position as will be described in more detail herein. The switch 130 is situated on the tool body 11 underneath the actuator 110 and is shown to comprise an electromechanical device, wherein the switch is closed to complete an electrical circuit upon being depressed by the actuator. The type and location of switch is not particularly limited by the present subject matter and can include purely electronic switches, which can be located elsewhere from that depicted in FIGS. 3 and 4A-4C, so long as the switch can be operated by the actuator. The switch 130 includes switch/motor communication channels 132, e.g., electrical connectors, for communicating with and actuating the motor 120 for driving the pump 60. Although not depicted, it will be understood that the tools of the present subject matter can also include a power source that is integral with the tool, such as that depicted in FIGS. 1 and 5 for example, or that is separate from the tool.

The tool 10 includes the control valve 90 for regulating flow of hydraulic fluid in the first return line 70. The control valve is operable by depressing the actuator 110 as will be described in more detail herein. The control valve is shown to comprise a spool valve that is biased to an open position. However, the control valve for the tool is not particularly limited by the present subject matter and can include any type of valve that is able to restrict flow of hydraulic fluid in the first return line 70, such as a gate valve, globe valve, butterfly valve, ball valve, or any other type or combination thereof.

As is shown in FIGS. 3 and 4A-4C, control valve 90 is configured to regulate fluid flow in the first return line 70, between the chamber 21 and the reservoir 40. In one embodiment, the control valve 90 includes a control valve spring 94, which biases the control valve in an open position. It will be appreciated that the present subject matter does not require a control valve spring for biasing the control valve, but can include other biasing means for biasing the control valve to an open position. In one embodiment, the actuator is mechanically connected to the control valve such that when the actuator is operated in the biased first state, the control valve is opened by the actuator. As part of the present subject matter one or more of the actuator and the control valve is biased such that the first return line 70 is normally open to fluid flow.

The tool 10 includes the pressure relief valve 100 as known in the art for regulating flow of hydraulic fluid in the second return line, between the chamber 21 and the reservoir 40. As previously described in regard to the hydraulic systems of the present subject matter, in one embodiment the pressure relief valve is automatic and has a set pressure and a reseating pressure. The pressure relief valve optionally includes a manual lever for opening the valve in an emergency or other situation, although this is not required.

The hydraulic tool 10 of the present subject matter includes the actuator 110 for operating the control valve 90 and the motor 120 of the pump 60. In one embodiment as depicted in FIGS. 3 and 4A-4C, the tool of the present subject matter comprises a lever-type trigger 110 pivotably connected to the tool body 11. It will be understood that the trigger/actuator 110 is not limited to that depicted in the figures and can comprise a trigger-type mechanism, an electronic actuator, or combinations thereof.

In an embodiment, the actuator 110 is physically connected to the control valve 90 for operating the control valve through a control valve actuator 95, as depicted in FIGS. 3 and 4A-4C. In this way, the control valve, and more specifically a fluid flow control member of the control valve, is moved to various positions when the actuator 110 is moved. In another embodiment, the actuator physically depresses the switch in order to close the switch and activate the motor. In this way, the switch is closed when the actuator is fully depressed. It will be understood that the present subject matter is not limited to this particular operating of the switch, and that other communication means can be used between the actuator 110 and the control valve 90 and switch 130 for operating the control valve and switch, such as electronic communication means, for example.

In another embodiment, the actuator 110 includes position indicators 112 for indicating to an operator the various positions of the actuator. As shown in FIGS. 3 and 4A-4C, the position indicators 112 are visual indicators comprising an arrow head 116 and hash marks 117. It will be understood that position indicators can include other types of visual, tactile, and audible indicators, or combinations thereof in accordance with the present subject matter. For example, detents can be added to the actuator mechanism such that various states of operation of the actuator can be felt by an operator. The visual position indicators 112 as depicted in FIGS. 3 and 4A-4C are shown for convenience in explaining the various states of operation of the actuator, and are not required for operation of the hydraulic tool 10.

In FIGS. 4A-4C, communication channel 132 and the motor 120 are omitted for simplification. FIGS. 4A-4C show various states of operation of the actuator 110 and the resulting effects such states of operation have on the control valve 90 and the switch 130. The following Table 1 will be used to help describe the various states of operation of the actuator 110 depicted in FIGS. 4A-4C.

actuator and the first position of the control valve are also associated with the switch 130 being in an open position (i.e. not depressed), thereby resulting in no fluid being pumped to the chamber from the reservoir.

In reference to FIG. 4B, the actuator 110 is being operated in a second state 114. In this second state, the control valve 90 has been moved to a second position 92 such that fluid flow in the first return line 70 is restricted. Also as shown in FIG. 4B, switch 130 has not been closed but remains in an open position (i.e. not depressed), and therefore the pump is not pumping. Position indicators 112 indicate that the control valve is in the second position, wherein the arrow head 116 on the actuator is pointing to a second of the hash marks 117 on the actuator assembly. The second state of the actuator is associated with the second position of the control valve and with the switch 130 being open. The control valve spring 94 is compressed such that the control valve is no longer in the open biased position, but closed. As a result, fluid flow back to the tank is prevented.

In reference to Table 1 and as depicted in FIG. 4C, the actuator 110 is operated in the third state 115 as indicated by the position indicators 112 on the actuator, wherein the arrow head 116 on the actuator is pointing to a third of the hash marks 117 on the actuator assembly. The control valve 90 is also in a third position 93 such that the control valve is still closed and the control valve spring 94 is further compressed. The third state of the actuator corresponds to the third position 93 of the control valve; both of which correspond to the switch 130 being in a closed position (i.e. depressed). The closed switch actuates the motor that drives the pump 60 for pumping hydraulic fluid from the reservoir

TABLE 1

Summary of Actuator States

| State of Actuator | Resulting Position of Control Valve | Resulting Position of Switch for Hydraulic Pump Motor | Effect on Piston |
| --- | --- | --- | --- |
| First State - Extended Biased Position | First Position - Open, allow flow to reservoir (Biased Position) | Open, no electrical connection between power supply and motor | Piston retracts |
| Second State - Intermediate | Second Position - Closed, no flow | Open, no electrical connection | Piston stops |
| Third State - Fully Depressed | Third Position - Closed, no flow | Closed, electrical connection established between power supply and motor | Piston advances |

Referring to Table 1, and as shown in FIG. 4A, the actuator 110 is in a first state 113 as indicated by the position indicators 112 located on the actuator assembly, wherein the arrow head 116 on the actuator is pointing to a first of the hash marks 117 on the actuator assembly. In the first state, the actuator 110 is in a fully extended biased position. In accordance with the present subject matter, one or both of the control valve 90 and the actuator 110 are biased to this position such that the first return line is normally open, thereby allowing hydraulic fluid to flow between the chamber 21 and the reservoir 40 through the first return line 70. As shown in FIG. 4A, the control valve 90 is open and the switch 130 for the pump is not depressed (i.e. open), wherein the motor 120 is not driving the pump 60 to pump hydraulic fluid through the supply line to the chamber. Accordingly, the piston is not advancing in the chamber. In certain embodiments, the piston can return to a fully retracted position.

The first state 113 of the actuator 110 corresponds to the first position 91 of the control valve 90. The first state of the 40 to the chamber 21 and against the rear surface of the piston in order to move the piston in an advancing stroke.

As is understood from FIGS. 1, 3, and 4A-4B, the switch 130 is biased to an open position, wherein no electrical connection is made to operate the motor 120. The switch 130 may be closed when the actuator 110 is operated in the third state 115 in order to depress the switch, as shown in FIG. 4C. In other embodiments as previously described in relation to FIG. 5, the switch 130 may be closed when the actuator 110 is operated in the second state.

The present subject matter provides a hydraulic system 1 and tool 10 that include two separate and distinct valves, i.e. the control valve 90 and the pressure relief valve 100, that are in parallel communication between the chamber and the reservoir for restricting the flow of hydraulic fluid from the chamber to the reservoir. The present subject matter also provides a single multi-position actuator, operable in three states for operating the control valve and the switch as described, in order to advance, retract, and hold the piston relative to the chamber.

Figure 6:
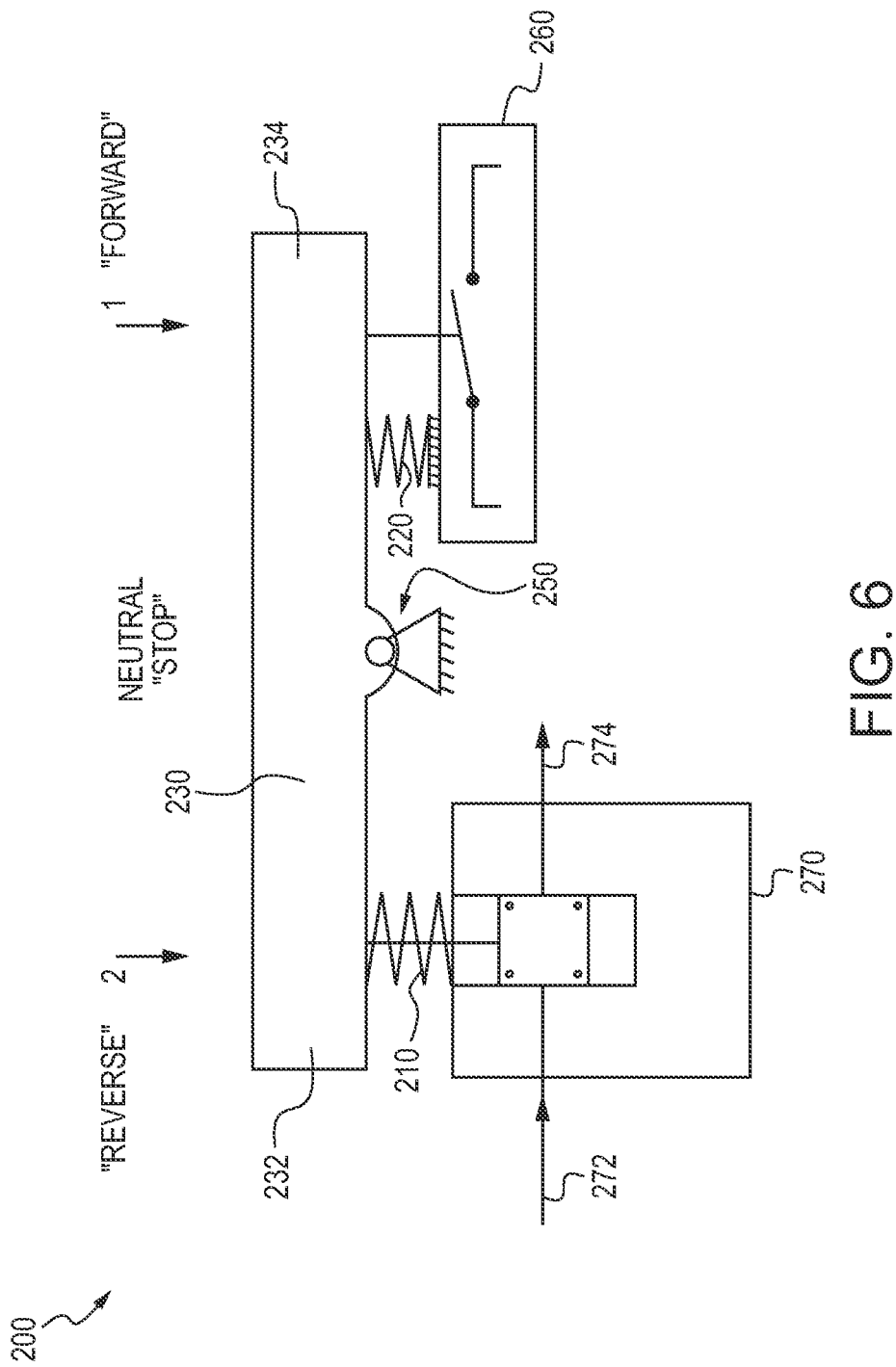
FIG. 6 is a schematic diagram of a multi-position actuator assembly in accordance with the present subject matter.

FIG. 6 is a schematic diagram of an alternate system 200 in accordance with the present subject matter. The system 200 comprises a multi-position actuator assembly 230 in operable and selective engagement with a switch 260 and a spool valve 270. The actuator 230 is supported at a support 250 which can be in the form of a pivotable support, and includes springs or other biasing members 210, 220 which bias or urge the actuator to an intermediate or "stop" position. The actuator 230 is in operable engagement with the switch 260 such that upon movement of an end 234 of the actuator 230 in the direction of arrow 1, the piston is caused to move in a "forward" direction. Depressing the end 234 of the actuator against spring 220, compresses the spring 220 and closes the switch 260 to thereby enable operation of the hydraulic fluid pump (not shown). This results in "forward" movement of the piston. Movement of an end 232 of the actuator 230 in the direction of arrow 2, compresses the spring 210 and opens the spool valve 270. The spool valve 270 is located in a hydraulic fluid line between hydraulic fluid line segments 272 from the hydraulic cylinder and 274 to the tank.

Table 2 is a summary of actuator states for the system depicted in FIG. 6.

TABLE 2

Summary of Actuator States

| Actuator Position | Valve Position | Switch Position | Result | Effect on Piston |
|---|---|---|---|---|
| Neutral | Closed | Open | Pump will not run, no fluid flow | Piston stops |
| Press 1 "Forward" | Closed | Closed | Pump runs, fluid is pumped into cylinder | Piston extended |
| Press 2 "Reverse" | Open | Open | Fluid returns to tank | Piston retracts |

An advantage of the system 200 utilizing a neutral center or intermediate position is that when a user releases the trigger, i.e., the actuator 230, the piston will remain in its current position.

Figure 7:
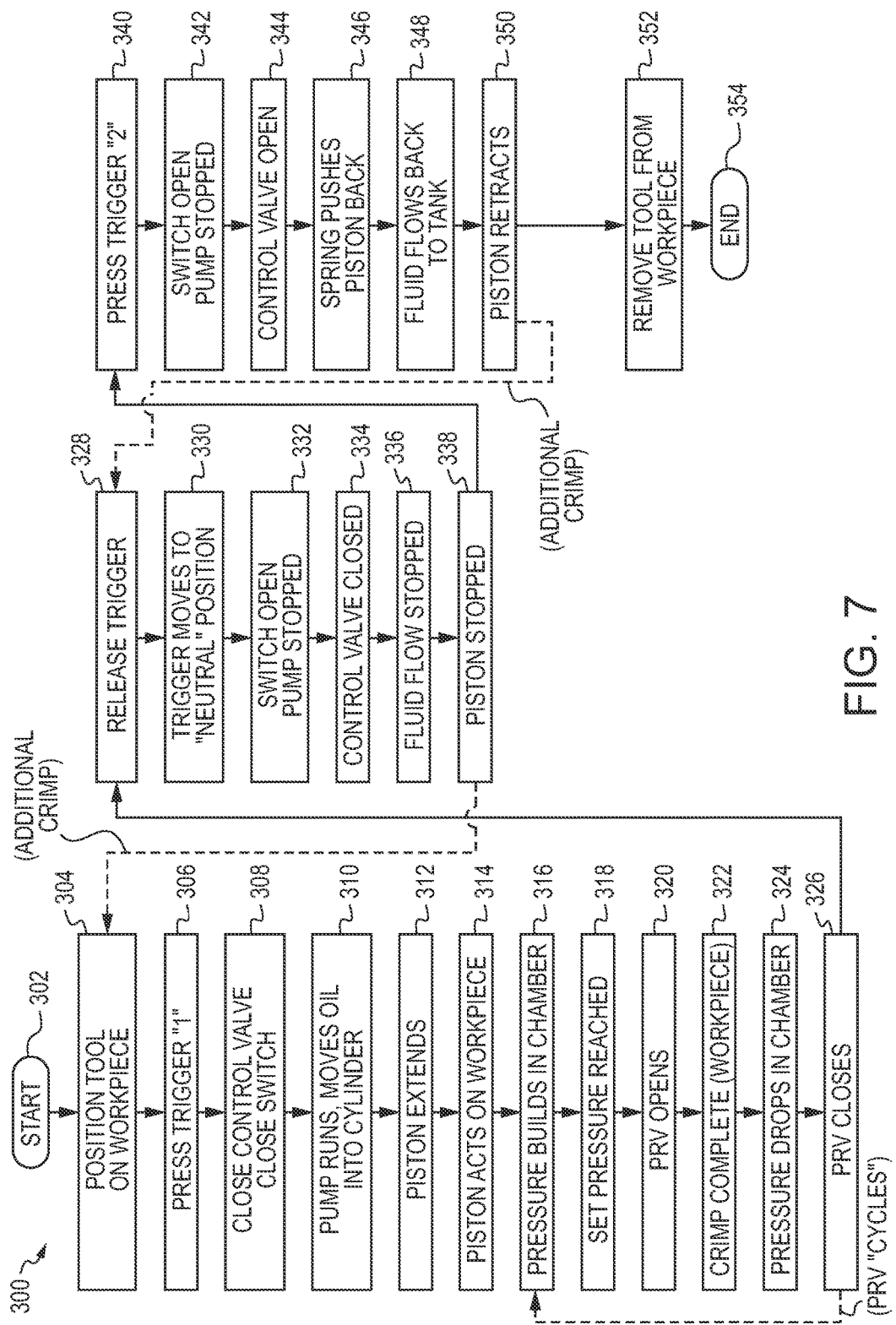
FIG. 7 is a schematic flow chart illustrating a method of operation of a hydraulic system using the actuator assembly of FIG. 6, in accordance with the present subject matter.

FIG. 7 is a schematic flow chart illustrating a method 300 in accordance with an embodiment of the present subject matter. The method 300 starts at 302 and includes one or more operations 304 of positioning the tool on a workpiece. The trigger or actuator of the tool such as actuator 230 in FIG. 6, is pressed as shown by arrow 1. This is shown in FIG. 7 as operation 306. As a result, the valve is closed and the switch is closed, i.e., 308. The hydraulic pump runs and moves hydraulic fluid into the hydraulic cylinder or chamber. This is shown as operation 310. The piston is then extended as shown by 312. At 314, the piston acts on the workpiece. At 316, hydraulic pressure builds in the chamber. This continues until at 318, a set pressure is reached. At 320, a hydraulic pressure relief valve (PRV) opens. The crimp or other operation being performed on the workpiece is complete, as shown at 322. At 324, the pressure in the chamber decreases. At 326, the hydraulic pressure relief valve then closes. The cycling of the pressure relief valve may be repeated by operations or states 316, 318, 320, 322, 324, and 326 again occurring.

Upon release of the trigger or actuator 230 (FIG. 6) shown in FIG. 7 as 328, the trigger moves to a neutral position. This is designated as 330 in FIG. 7. The switch 260 in FIG. 6 is opened thereby stopping the pump. This is designated as 332. At 334, the control valve is closed. Hydraulic fluid flow stops, as denoted at 336. The piston then stops, as designated at 338.

If an additional crimp is desired, the previously described operations can be performed, i.e., 304, 306, 308, 310, 312, 314, 316, 318, 320, 322, 324, and 326 with one or more optional cycles of 316, 318, 320, 322, 324 and 326.

At state 338, if crimping is complete, the operator presses the trigger to reverse the piston, as shown by operation 340. The switch 260 is opened and the pump stopped as denoted at 342. The control valve is open as shown at 344. The spring of the spring biased piston causes the piston to retract as shown at 346. Hydraulic fluid flows back to the tank, as shown at 348. The piston retracts as shown at 350. The tool can then be removed from the workpiece as shown at 352. The method 300 is completed at 354.

In certain embodiments, the present subject matter provides a method of operating a hydraulic tool comprising a tool body and a chamber at least partially defined by the tool body. The tool also comprises a spring biased piston movably mounted relative to the chamber and a reservoir in fluid communication with the chamber. The tool also comprises a supply line for enabling hydraulic fluid flow from the reservoir to the chamber and a pump configured to pump hydraulic fluid through the supply line to the chamber for moving the piston relative to the chamber. The tool also comprises a first return line and a second return line for transporting hydraulic fluid from the chamber to the reservoir. The tool also comprises an unbiased control valve configured to regulate flow of hydraulic fluid in the first return line. The tool also comprises a pressure relief valve configured to regulate flow of hydraulic fluid in the second return line, wherein the control valve and the pressure relief valve are arranged in parallel between the chamber and the reservoir. The tool also comprises an actuator and switch for operating the pump and the control valve. The actuator is physically connected to the control valve and biased to a fully extended position such that the control valve is open when the actuator is not depressed. The method comprises closing the control valve using the actuator to thereby prevent the piston from retracting. The method further comprises activating the pump using the actuator to thereby initiate an advancing stroke of the piston. The method further comprises deactivating the pump using the actuator to thereby halt the advancing stroke. The method further comprises opening the control valve using the actuator to thereby allow the spring to retract the piston. The method further comprises optionally repeating the closing, activating, deactivating, and opening operations for subsequent advancing strokes, wherein subsequent closing of the control valve can be accomplished before the piston is fully retracted. Closing, activating, deactivating, and opening are executed by depressing and releasing the actuator.

The systems and hydraulic tools of the present subject matter can include various other additional components, such as additional valves, additional fluid lines, filters, seals, ports, fittings, etc. Additionally, the present subject matter is not limited to the actuator, valves, switches, and fluid lines as depicted in the figures. It will be understood that various actuators, valves, switches, and fluid lines can be used in the present subject matter, without departing from the scope or spirit of the present subject matter.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A hydraulic tool comprising:
   a tool body;
   a hydraulic cylinder at least partially enclosed and supported within the tool body, the cylinder defining a chamber;
   a fluid reservoir in flow communication with the cylinder;
   a fluid inlet line providing flow communication between the fluid reservoir and the chamber of the hydraulic cylinder;
   a fluid pump in flow communication with the reservoir and the cylinder via the inlet line, the pump being selectively operable to displace fluid from the reservoir into the chamber;
   a biased piston movably disposed in the chamber of the hydraulic cylinder, wherein upon displacement of fluid into the chamber from the pump, the piston is moved away from a biased position;
   a pressure relief valve in flow communication with the chamber of the hydraulic cylinder and the reservoir;
   a fluid return line providing flow communication between the chamber of the hydraulic cylinder and the reservoir; and
   a multi-position return valve in flow communication with the chamber of the cylinder and the reservoir via the return line, the return valve having a plurality of valve positions including a biased open position and a closed position,
   wherein the return valve is biased to the normally open position, thereby allowing fluid flow between the chamber of the hydraulic cylinder and the reservoir,
   wherein upon positioning the return valve in the closed position, the return valve thereby prevents fluid flow via the fluid return line between the chamber of the hydraulic cylinder and the reservoir,
   wherein the return valve comprises a fluid control member such that upon positioning the return valve between the open position and the closed position, the fluid control member is moved across a direction of fluid flow in the fluid return line at the return valve.

2. The hydraulic tool of claim 1, wherein the direction of movement of the fluid control member is transverse to the direction of fluid flow in the fluid return line at the return valve.

3. The hydraulic tool of claim 2, wherein the fluid control member is displaceable to a plurality of locations including a first location, a second location, and a third location, wherein at the first location the fluid control member is not inserted into the fluid flow of the return line and at the second and third locations the fluid control member is inserted into the fluid flow of the first return line.

4. The hydraulic tool of claim 1, wherein the pressure relief valve and the return valve are separate and independent from one another and a smallest orifice in the return valve is larger than a smallest orifice in the pressure relief valve.

5. The hydraulic tool of claim 1, further comprising a trigger assembly engageable with the multi-position return valve, the trigger assembly including an actuation member for positioning the return valve.

6. The hydraulic tool of claim 1, wherein the tool is an electrohydraulic tool, the electrohydraulic tool further comprising:
   an electric motor engaged with the pump such that upon actuation of the electric motor the pump is operated.

7. The hydraulic tool of claim 6, further comprising control provisions configured such that upon the return valve being positioned to the normally open position, the electric motor is not actuated.

8. The hydraulic tool of claim 7 wherein the open position comprises a first position, and the closed position comprises a second intermediate position and a third position, wherein at the second intermediate position the control provisions are configured such that the electric motor is not actuated.

9. The hydraulic tool of claim 8 wherein at the third position the control provisions are configured such that the electric motor is actuated.

10. The hydraulic tool of claim 1 wherein the biased piston is biased by a spring.

11. A hydraulic tool comprising:
    a chamber;
    a piston movably mounted relative to the chamber;
    a reservoir in fluid communication with the chamber;
    a supply line for transporting hydraulic fluid from the reservoir to the chamber;
    a pump configured to pump hydraulic fluid through the supply line to the chamber for moving the piston relative to the chamber;
    a first return line and a second return line for transporting hydraulic fluid from the chamber to the reservoir;
    a control valve configured to regulate flow of hydraulic fluid in the first return line, wherein fluid flow in the first return line between the chamber and the reservoir is not restricted by the control valve when the control valve is open, and fluid flow in the first return line between the chamber and the reservoir is restricted when the control valve is closed;
    a pressure relief valve configured to regulate flow of hydraulic fluid in the second return line, wherein the control valve and the pressure relief valve are in parallel communication between the chamber and the reservoir; and
    an actuator for actuating the pump and the control valve, the actuator configured to be operable in a first state wherein the control valve is open and the pump is not pumping, a second state wherein the control valve is closed and the pump is not pumping, and a third state wherein the control valve is closed and the pump is pumping,
    wherein at least one of the following is provided:
    (a) the actuator is biased to the first state; and
    (b) the control valve is biased open.

12. The hydraulic tool of claim 11, wherein the control valve is closed by operation of the actuator in the second and third states.

13. The hydraulic tool of claim 11, wherein both (a) and (b) are provided.

14. The hydraulic tool of claim 11, wherein the actuator is biased to the first state and wherein the control valve is opened and closed by operating the actuator between the first, second, and third states.

15. A hydraulic tool comprising:
a chamber;
a piston movably mounted relative to the chamber;
a reservoir in fluid communication with the chamber;
a supply line for transporting hydraulic fluid from the reservoir to the chamber;
a pump configured to pump hydraulic fluid through the supply line to the chamber for moving the piston relative to the chamber;
a first return line and a second return line for transporting hydraulic fluid from the chamber to the reservoir;
a control valve configured to regulate flow of hydraulic fluid in the first return line, wherein fluid flow in the first return line between the chamber and the reservoir is not restricted by the control valve when the control valve is open, and fluid flow in the first return line between the chamber and the reservoir is restricted when the control valve is closed;
a pressure relief valve configured to regulate flow of hydraulic fluid in the second return line, wherein the control valve and the pressure relief valve are in parallel communication between the chamber and the reservoir; and
an actuator for actuating the pump and the control valve, the actuator configured to be operable in a first state wherein the control valve is open and the pump is not pumping, a second state wherein the control valve is closed and the pump is not pumping, and a third state wherein the control valve is closed and the pump is pumping,
wherein:
the control valve is operable in a first position, a second position, and a third position, the control valve being open in the first position and closed in the second and third positions; and
the control valve is biased to the first position.

16. The hydraulic tool of claim 15, wherein:
the control valve is in the first position when the actuator is operated in the first state;
the control valve is in the second position when the actuator is operated in the second state; and
the control valve is in the third position when the actuator is operated in the third state.

17. The hydraulic tool of claim 15, wherein the control valve comprises a fluid control member such that upon operating the control valve between the first, second and third positions, the fluid control member is displaced in a non-parallel direction with a direction of fluid flow in the fluid return line at the return valve.

18. A hydraulic tool comprising:
a chamber;
a piston movably mounted relative to the chamber;
a reservoir in fluid communication with the chamber;
a supply line for transporting hydraulic fluid from the reservoir to the chamber;
a pump configured to pump hydraulic fluid through the supply line to the chamber for moving the piston relative to the chamber;
a first return line and a second return line for transporting hydraulic fluid from the chamber to the reservoir;
a control valve configured to regulate flow of hydraulic fluid in the first return line, wherein fluid flow in the first return line between the chamber and the reservoir is not restricted by the control valve when the control valve is open, and fluid flow in the first return line between the chamber and the reservoir is restricted when the control valve is closed;
a pressure relief valve configured to regulate flow of hydraulic fluid in the second return line, wherein the control valve and the pressure relief valve are in parallel communication between the chamber and the reservoir; and
an actuator for actuating the pump and the control valve, the actuator configured to be operable in a first state wherein the control valve is open and the pump is not pumping, a second state wherein the control valve is closed and the pump is not pumping, and a third state wherein the control valve is closed and the pump is pumping;
an electronic communication channel configured to establish a communication with the pump when the pressure relief valve opens, the communication preventing the pump from pumping, wherein the communication is discontinued when the actuator is operated in the first and second states.

* * * * *